United States Patent [19]
Wilkinson et al.

[11] Patent Number: 4,996,839
[45] Date of Patent: Mar. 5, 1991

[54] TURBOCHARGED COMPOUND CYCLE DUCTED FAN ENGINE SYSTEM

[75] Inventors: Ronald Wilkinson; Ralph Benway, both of Mobile, Ala.

[73] Assignee: Teledyne Industries, Inc., Los Angeles, Calif.

[21] Appl. No.: 329,661

[22] Filed: Mar. 29, 1989

Related U.S. Application Data

[63] Divisional Ser. No. 17,825, Feb. 24, 1987, Pat. No. 4,815,282.

[51] Int. Cl.⁵ .................................................. F02K 5/02
[52] U.S. Cl. ........................................ 60/247; 60/263; 60/269; 60/605
[58] Field of Search ................... 60/598, 605, 606, 612, 60/624, 226.1, 247, 263, 269

[56] References Cited

U.S. PATENT DOCUMENTS

| | | | |
|---|---|---|---|
| 2,385,366 | 9/1945 | Lysholm | 60/263 X |
| 2,465,099 | 3/1949 | Johnson | 60/247 X |
| 2,580,591 | 1/1952 | Pouit | 60/226.1 |
| 2,755,618 | 7/1956 | Peterson | 60/624 X |
| 3,080,704 | 3/1963 | Nallinger | 60/624 |

FOREIGN PATENT DOCUMENTS

| | | | |
|---|---|---|---|
| 3330315 | 3/1985 | Fed. Rep. of Germany | 60/624 |
| 916985 | 9/1946 | France | 60/606 |
| 437018 | 10/1935 | United Kingdom | 60/612 |

*Primary Examiner*—Michael Koczo
*Attorney, Agent, or Firm*—Gifford, Groh, Sprinkle, Patmore and Anderson

[57] ABSTRACT

A turbocharged, compounded cycle ducted fan engine system includes a conventional internal combustion engine drivingly connected to a fan enclosed in a duct. The fan provides propulsive thrust by accelerating air through the duct and out an exhaust nozzle. A turbocharger is disposed in the duct and receives a portion of the air compressed by the fan. The turbocharger compressor further pressurizes the air and directs it to the internal combustion engine where it is burned and exits as exhaust gas to drive the turbine. A power turbine also driven by exhaust gas is also drivingly connected through the engine to the fan to provide additional power. The size and weight of the turbocharger are reduced since the compressor's work is partially achieved by the compression effect of the fan. The total propulsive thrust includes the fan generated thrust which bypasses the turbocharger and the thrust of exhaust gases exiting the turbine.

10 Claims, 2 Drawing Sheets

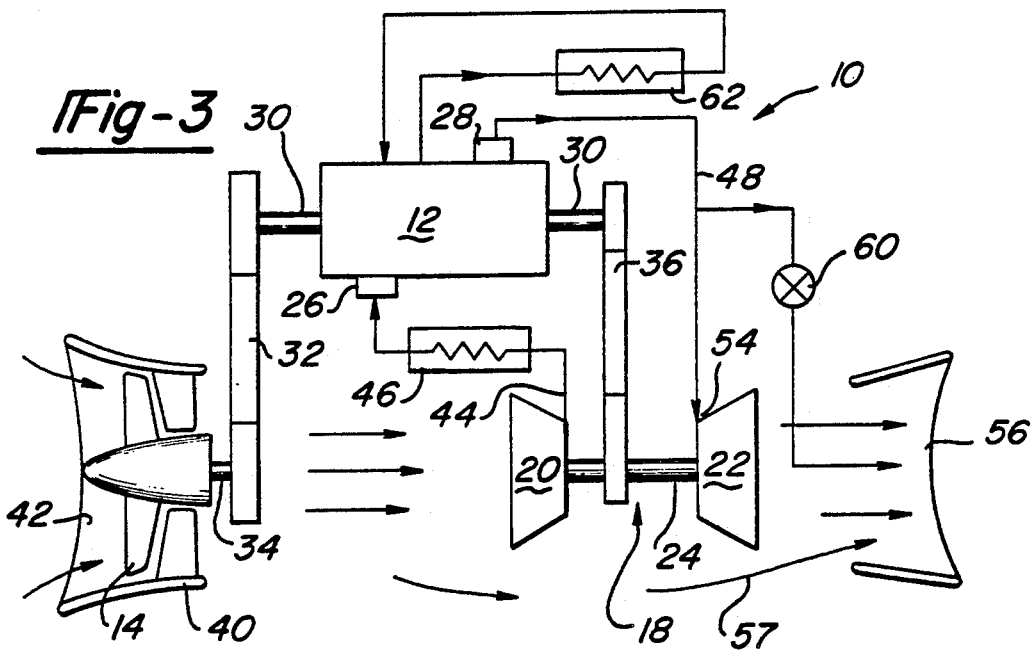
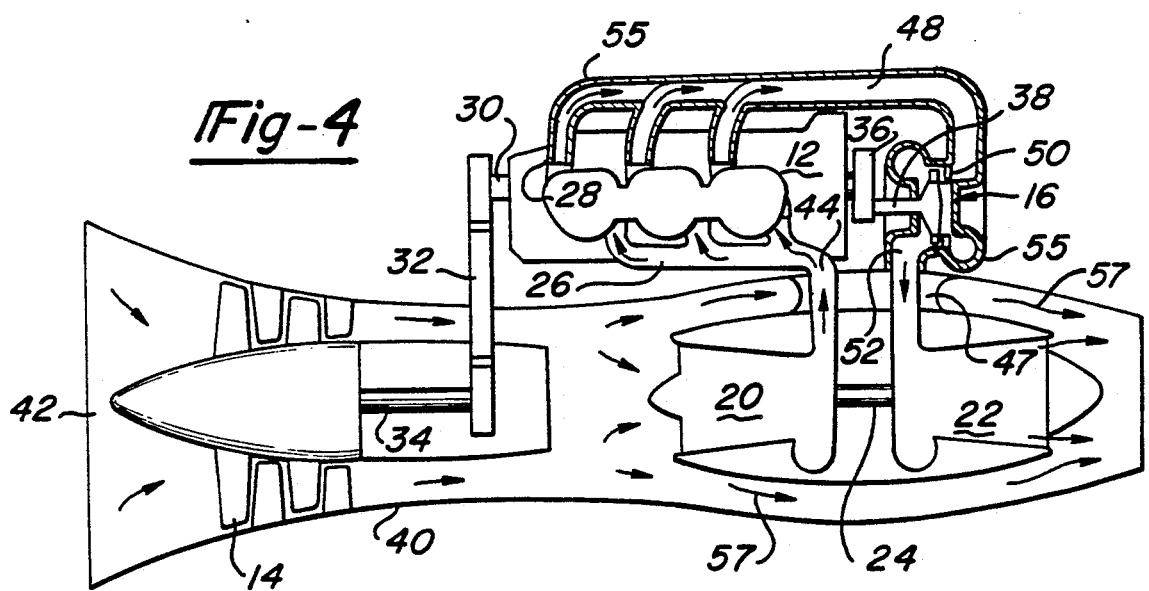

TURBOCHARGED COMPOUND CYCLE DUCTED FAN ENGINE SYSTEM

This is a divisional of co-pending application Ser. No. 07/017,825 filed on Feb. 24, 1987, U.S. Pat. No. 4,815,282.

BACKGROUND OF THE INVENTION

I. Field of the Invention

This invention relates to propulsion systems for aircraft and, in particular, to a turbocharged internal combustion engine compounded with a gas turbine to drive a ducted fan to generate the required propulsive thrust for most efficient operation at high subsonic flight speeds through the upper limits of the tropopause into the lower levels of the stratosphere.

II. Description of the Prior Art

It has been previously recognized that internal combustion engines are more fuel efficient than gas turbine engines in aircraft.

It has been previously recognized that internal combustion engines are more fuel efficient than gas turbine engines in aircraft. The specific fuel consumption of a conventional gas turbine increases with altitude and is also higher at part load as compared to the internal combustion engine. Well designed turbocharged piston engines are capable of providing a specific fuel consumption at high altitudes equal to or better than that available at sea level, with part load specific fuel consumption also equal to or better than that attained at maximum load.

However, gas turbines have largely replaced internal combustion engines for low altitude operation due to their smaller size and lighter weight for a given thrust level. Although this size and weight advantage diminishes with ascending altitude, gas turbines have been the powerplant normally used for high altitude high speed flight due to the absence of a more efficient, lighter weight option.

It has also been recognized that propellers or propulsors which moderately accelerate a large volume of air are highly efficient at flight speeds of about mach 0.6 or less, while turbo fans which greatly accelerate a smaller volume of air are less efficient at such low air speeds, but increase in efficiency as flight speed increases. Therefore, for high subsonic or supersonic flight, turbo fans or turbo jets have previously been the preferred propulsion systems.

SUMMARY OF THE PRESENT INVENTION

This invention provides an improvement over previously known turbo fan propulsion systems by compounding a highly fuel efficient internal combustion engine with a gas powered turbine. The internal combustion engine may be of either the spark ignition or the compression ignition type. The outputs of the combustion engine and the power turbine are connected through appropriate drive transmissions to drive a fan. The fan provides the bulk of the propulsive thrust necessary for aircraft flight. In the preferred embodiment, the fan is enclosed in a duct.

The combustion engine is turbocharged in order to provide sea level horsepower to high altitudes. For this purpose, a turbocharger, consisting of an exhaust gas driven turbine connected to a compressor by a drive shaft is included. The compressor generates sufficient air pressure to turbocharge the combustion engine. The fan, the compressor and the turbine each may be single or multiple stage as desired, and the power turbine preferably is a free turbine not mechanically linked to the turbocharger shaft. A conventional heat exchanger coolant system is used for the combustion engine and waste gates may be provided so that exhaust gas can bypass either the power turbine or the turbocharger, or both, if desired.

In the present invention, the turbocharger is disposed downstream from the propulsive fan. This enables a compressor of smaller weight and dimension to produce the pressure required to turbocharge the combustion engine. Thus, the entire engine system is lighter, more streamlined and more efficient. In the preferred embodiment, the fan and turbocharger are coaxial and the combustion engine is located closely adjacent the turbocharger to minimize power losses in drive trains and heat losses in gas conduits.

BRIEF DESCRIPTION OF THE DRAWING

The present invention will be more fully understood by reference to the following detailed description when read in conjunction with the accompanying drawing, in which like reference characters refer to like parts throughout the several views, and in which:

FIG. 3 is a schematic diagram of another alternative embodiment of the present invention; and FIG. 4 is a side diagrammatic view of a preferred embodiment of the present invention.

DETAILED DESCRIPTION OF THE PREFERRED EMBODIMENT

Figure 1:
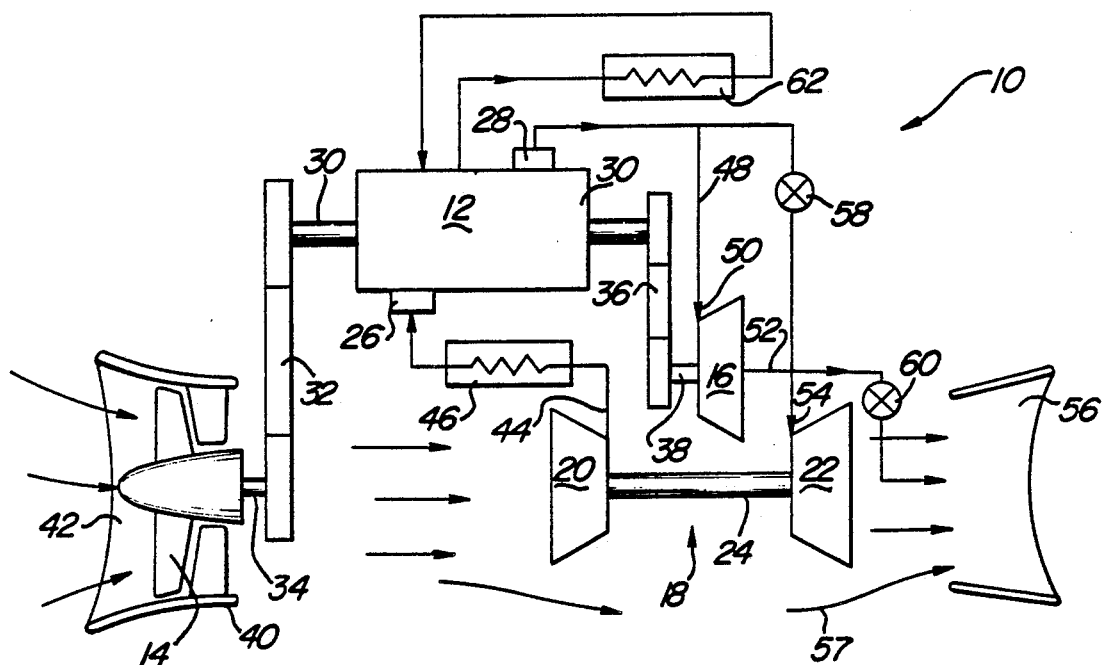
FIG. 1 is a schematic diagram of the components of the present invention.

Referring first to FIG. 1, the engine system 10 is thereshown in diagrammatic form, generally comprising an internal combustion engine 12, a fan 14, a power turbine 16 and a turbocharger 18 comprising a compressor 20 and a turbine 22 coaxially mounted on a common shaft 24. The combustion engine 12 may be of the spark ignition type or the compression ignition type and includes an air inlet 26 and an exhaust outlet 28. The combustion engine 12 further includes a drive shaft 30 which is connected via an appropriate first drive transmission 32 to a shaft 34 of the fan 14. The drive shaft 30 is also connected through an appropriate second drive transmission 36 to a shaft 38 of the power turbine 16.

The fan 14 may be of one or more stages and may include blades having variable angular adjustments for variable thrust generation and preferably includes a duct 40 and an inlet diffuser 42. The duct 40 may be elongated as shown in FIG. 4 to include the turbocharger 18 so that some of the air flow leaving the fan 14 can enter the compressor 20. The compressor 20 then further pressurizes the air and exhausts it through conduit 44 and intercooler 46 to the engine inlet 26. In the preferred embodiment, as shown in FIG. 4, the compressor 20 and the ducted fan 14 are coaxial, and are concentric with the elongated duct 40. They can be susported in the duct by struts such as at 47.

According to a process well known in the art, the air is further compressed by the piston stroke of the combustion engine 12, and mixed with fuel. The resulting mixture is ignited and exhausted following the power stroke through exhaust outlet 28 at high pressure and temperature. The exhaust gases leaving the combustion engine 12 are conducted via conduit 48 to a nozzle 50 where they are directed to impinge on the blades of the power turbine 16. Thereafter, the gases may be led further by a conduit 52 and a nozzle 54 to impinge on the blades of the turbine 22 Finally, the exhaust gases are directed out of the engine system 10 through the exhaust nozzle 56. Preferably, the gas conduits 48 and 52 are designed to be as short as possible and are insulated, as shown at 55 in FIG. 4, to maximize heat energy delivered to the turbines 16, 22.

Figure 2:
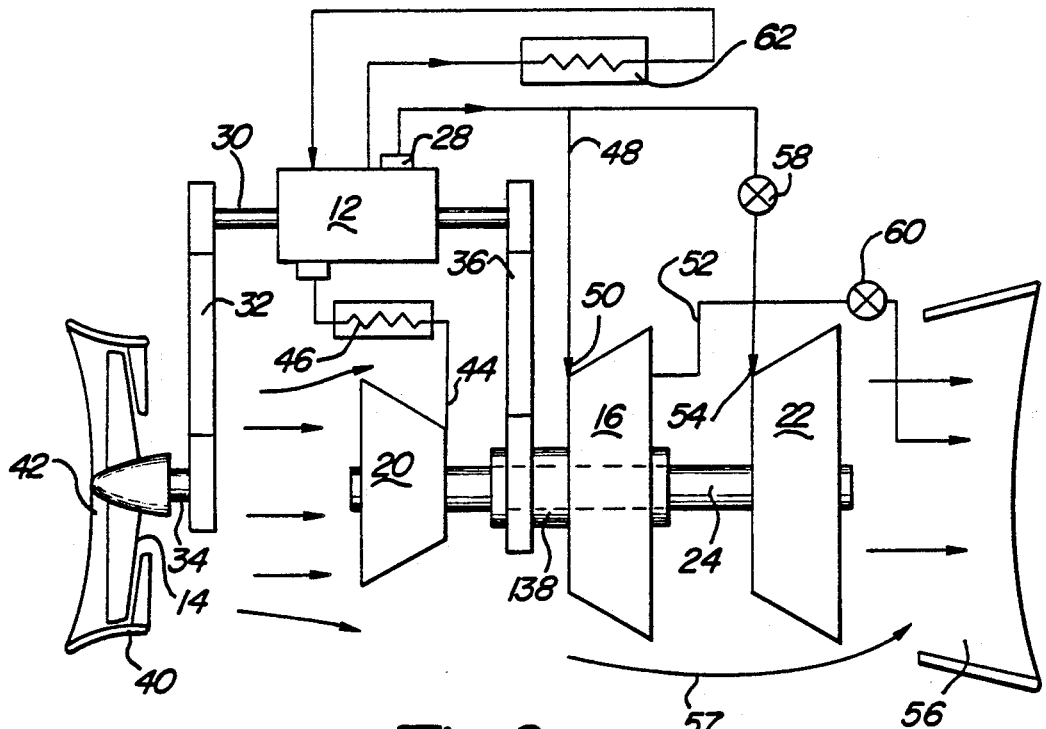
FIG. 2 is a schematic diagram of an alternative embodiment of the present invention.

It is possible for the power turbine 16 to be rotatably supported separate from the turbocharger 18 and close coupled to the engine 12 as shown in FIGS. 1 and 4. Alternatively, the power turbine 16 may rotate on a tubular shaft 138 which is coaxial with the turbocharger core shaft 24 as shown in FIG. 2. In this arrangement, however, it is preferable to have the power turbine 16 and its tubular shaft 138 rotate independently of the shaft 24 and its associated compressor 20 and turbine 22. In this way, the turbocharger compressor 20 and the turbine 22 can turbocharge the engine 12 independently of the power turbine 16, which provides additional drive to the fan 14 through the second drive transmission 36, the drive shaft 30 and the first drive transmission 32.

FIG. 3 illustrates an alternative approach to turbocompounding where the turbocharger turbine 22 is geared directly back into the engine driveshaft 30. Such a system transmits the difference in power produced by the turbine 22 and that demanded by the compressor 20.

Under certain engine operating conditions, it is desirable to bypass either the power turbine 16 or the turbine 22, or both. Waste gates 58 and 60 serve these respective purposes. By selective operation of the waste gates 58 and 60, the level of engine turbocharging (manifold pressure boost) is controlled and a proper balancing of drive input from the combustion engine 12 and the power turbine 16 can be achieved The air exhausted from the fan 14 which does not enter the compressor 20 is directed through the duct 40 to the exhaust nozzle 56 as indicated by arrows 57. The net propulsive thrust of the engine system 10 is the sum of the thrust provided by the fan 14 which bypasses the compressor 20 and the thrust provided by the exhaust exiting turbine 22.

A conventional heat exchanger 62 may be employed to cool the combustion engine 12. The first drive transmission 32 and the second drive transmission 36 preferably comprise compact, lightweight speed reduction systems which produce minimal loss of output power. In addition, the second drive transmission 36 may include an overrunning clutch (not shown) to prevent the engine 12 from driving the power turbine 16 and a fluid coupling (not shown) to attenuate the effect of engine torsional vibration upon the power turbine 16.

Having described the various structural features of the present invention, its advantageous operation will now be described. As previously mentioned, high altitude, high speed flight has generally utilized a turbo fan or turbo jet type propulsion system and these systems have been fuel inefficient compared with internal combustion engines.

DESCRIPTION OF PREFERRED EMBODIMENT

Characteristic of aircraft gas turbine powerplants, the power available at altitude is significantly reduced from the power available at sea level due to the effect of the low density air at altitude. As a result, for a given thrust requirement at high altitude, a gas turbine is well over designed for operation at sea level and low altitude.

In comparison, a turbocharged internal combustion engine can maintain rated power from sea level to high altitude. Furthermore, due to the lower air consumption requirements of the internal combustion engine, the associated turbomachinery size and weight are substantially reduced as compared to a conventional gas turbine at the same thrust level.

It therefore becomes evident that a turbocharged internal combustion engine begins to achieve a definite weight and size advantage in addition to more fuel efficient operation as compared to the conventional gas turbine at high altitude.

Furthermore, it is seen that the size of the associated turbomachinery for the turbocharged engine approaches a point at high altitude where it becomes advantageous to design the inlet compressor stage as a fan to act as the main propulsor in addition to providing a stage of compression for the engine turbocharger system. Otherwise, to supply air of sufficient density to the engine, rather large and heavy turbochargers would typically be required, adding to the bulk and weight of the aircraft engine.

The improvement of the present invention enables turbochargers of smaller weight and dimension to be employed in aircraft engine systems for high subsonic flight at high altitude. By arranging the turbocharger compressor downstream from the fan, and by enclosing the entire system in a common duct, the compressor receives at its inlet air which is already somewhat pressurized by the fan. Because of this, the work which must be done by the compressor is reduced, thereby enabling a smaller compressor than would otherwise be possible. Since the net increase in power output realized by turbocharging is dependent upon the power required to drive the compressor, and less power is needed to drive the compressor of the present invention.

Additionally, the engine system of the present invention enjoys the fuel efficiency of an internal combustion engine, as well as the propulsive efficiency of a ducted fan, which makes it conducive to high altitude high speed flight. Moreover, compared to a turbine engine providing equivalent thrust, the turbocharger air flow can be smaller due to the lower fuel to air ratio associated with an internal combustion engine, therefore providing a higher thrust specific air consumption (TSAC) with reduced size and weight. Also, more of the propulsive thrust generated by the fan bypasses the turbocharger and proceeds directly to the exhaust nozzle.

The combination of fuel efficient internal combustion engine with low heat rejection features, turbocompounding, and a ducted fan propulsor with a co-axial turbocharger provides a flight propulsion system for high subsonic flight at altitudes through the upper limits of the tropopause into the lower levels of the stratosphere with improved efficiencies and lighter weight as compared to conventional gas turbine powerplants.

The foregoing detailed description of the preferred embodiment has been given for clearness of understanding only, and no unnecessary limitations should be understood therefrom. Some modifications will be obvious to those skilled in the art to which the invention pertains, without deviation from the spirit of the invention as defined by the scope of the appended claims.

We claim:

1. A propulsion engine system for aircraft comprising:

an internal combustion engine including a rotatable drive shaft, an air inlet and an exhaust outlet;

a fan for generating thrust, said fan being rotatably mounted in a duct and drivingly connected to said drive shaft;

a turbocharger including a turbine having an inlet and an outlet and a compressor having an inlet and an outlet, wherein said turbine is arranged for rotation with said compressor, and said turbine inlet is connected to said exhaust outlet and said compressor outlet is connected to said air inlet of said combustion engine;

means for selectively, drivingly connecting said turbine to said drive shaft including a turbocharger shaft common to said turbine and said compressor, and reduction gearing between said turbocharger shaft and said drive shaft;

wherein said compressor inlet is disposed in said duct downstream from said fan to receive at least a portion of the air thrust from said fan.

2. The invention as defined in claim 1 wherein said internal combustion engine is disposed adjacent said turbocharger.

3. The invention as defined in claim 1 wherein said exhaust outlet and said turbine inlet and intermediate connections are insulated to minimize energy loss.

4. The invention as defined in claim 1 wherein said fan is multistage.

5. The invention as defined in claim 1 wherein said compressor is multistage.

6. The invention as defined in claim 1 wherein said turbine is multistage.

7. The invention as defined in claim 1 and comprising an intercooler disposed between said compressor and said internal combustion engine.

8. The invention as defined in claim 1 and comprising a heat exchanger for cooling said internal combustion engine.

9. The invention as defined in claim 1 wherein said fan and said compressor are coaxial.

10. The invention as defined in claim 1 wherein said turbine is geared directly back into said engine drive shaft.

* * * * *